Dec. 16, 1958  J. H. HOLLYDAY ET AL  2,864,477
TRANSVERSELY ENGAGING PIN CLUTCH
Filed Nov. 19, 1956
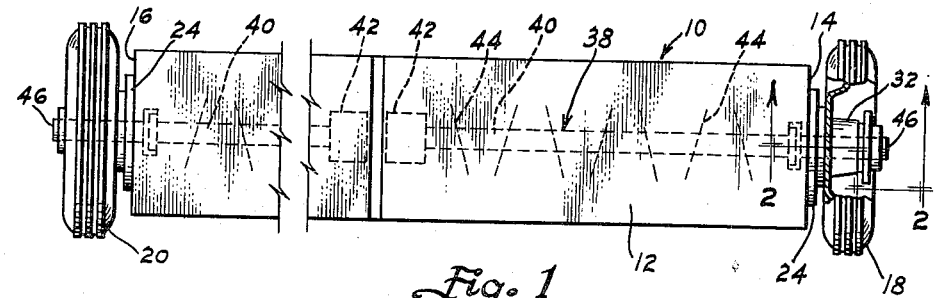
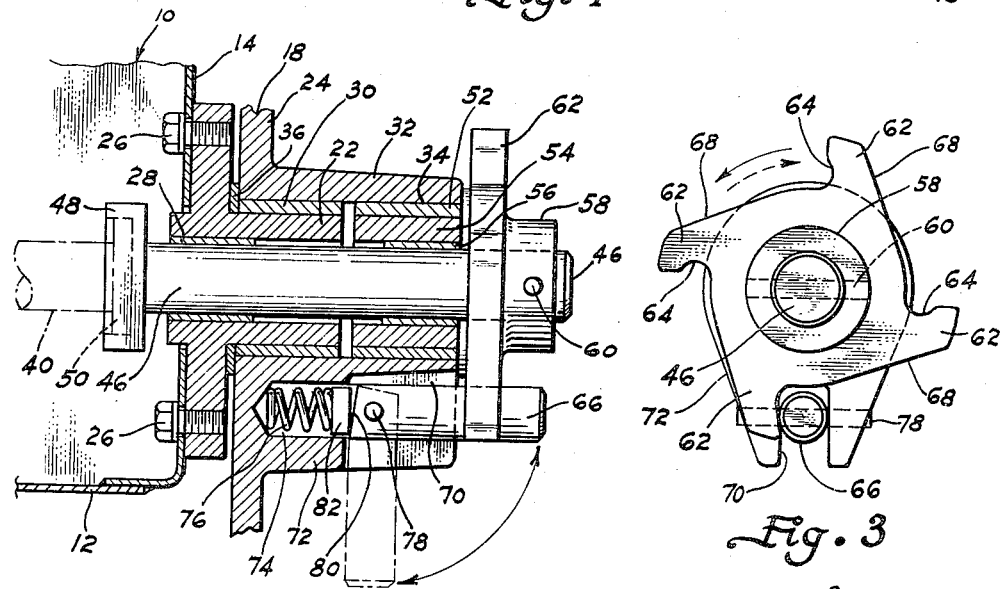
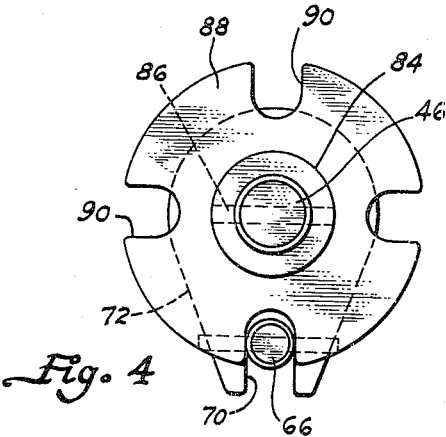
INVENTORS
JAMES H. HOLLYDAY
JAMES L. STACKHOUSE, JR.
BY
ATTORNEY

United States Patent Office 2,864,477
Patented Dec. 16, 1958

2,864,477

TRANSVERSELY ENGAGING PIN CLUTCH

James H. Hollyday, New Holland, and James L. Stackhouse, Jr., Lancaster, Pa., assignors to Sperry Rand Corporation, New Holland, Pa., a corporation of Delaware Application November 19, 1956, Serial No. 623,155

4 Claims. (Cl. 192—71)

This invention relates to improvements in drive means for agricultural distributors and more particularly, in drive means for agricultural distributors of the type used to discharge lime, fertilizer, feeds, and the like at a desired rate. Distributors of this nature usually are provided with an elongated body capable of containing the materials to be distributed. The sides of the body, in contrast with the front and back thereof, are relatively small and a pair of wheels are pivotally interconnected to the opposite sides of the body for purposes of supporting the distributor so that it may be pulled by suitable means such as a tractor over fields, pastures, and the like.

To facilitate the discharge of the material to be distributed, the body usually is provided with an agitator rotated adjacent the bottom of the body. Said bottom is formed with a number of discharge outlets which usually are adjustable in size to regulate the amount of material to be distributed. In most constructions of this type, the agitator is rotated by more or less direct connection with the supporting wheels of the distributor, thus permitting a simple construction not requiring any additional power means other than the tractor or other means by which the distributor is pulled while supported by the wheels attached to the distributor.

Under many circumstances, it is necessary to move the distributor from place to place under conditions which it is not necessary or desired to rotate the agitator within the body. Hence, it is desirable that suitable clutch means be provided between the wheels which support the body and the agitator within the body. Further, when backing the distributor, it usually is desired that no agitation or distribution of the material takes place. Also, when the distributor is making a very sharp turn as at the corner of a field or pasture, it is wasteful and therefore undesirable to discharge material either at all or at the usual rate from the end of the distributor which is nearest the wheel constituting the pivot wheel when such sharp turn is being executed. However, it is desired under these circumstances to distribute material from the opposite end of the distributor farthest from the pivot wheel. Accordingly, distributors of this nature frequently are provided with an agitator shaft which is divided intermediately of its ends, the several sections of the shaft respectively being driven by the wheels at the opposite ends of the distributor, thereby permitting some flexibility in controlling distribution from the opposite ends of the body.

Heretofore, very few attempts have been made to provide distributors of this nature with suitable clutch means for purposes of disconnecting the supporting and driving wheels of the distributor from the agitator or agitator shaft within the body of the distributor. Due also to the fact that the distributor usually trails a tractor implement, it is not convenient to provide a clutch mechanism of simple nature which is operable from the driver's seat of the tractor.

It is the principal object of the present invention to provide clutch means operable between the supporting wheels of an agricultural distributor of the type referred to and the agitating means within the body of the distributor, whereby when the distributor is being pulled forwardly by a tractor, the agitator will be rotated in preferably direct relationship with the supporting wheels, while when the distributor is being moved from place to place under conditions where no distribution or discharge of material is desired, said clutch means easily and readily may be operated to disengage the wheels from the agitator.

It is another object of the invention to provide clutch means which will operate automatically under certain conditions such as when the distributor is being moved backward, to disconnect the wheels from the agitator. Such an arrangement particularly is convenient to use at the completion of a distribution operation and it is desired to effect such disconnection in order that the distributor may be moved to another field or to a storage shed for example without operating the agitator. Still further, such arrangement also is convenient to use when a sharp turn is being executed and the inside or pivot wheel of the distributor actually may be moved in reverse direction slightly, thereby disconnecting said inside wheel from the agitator shaft section driven thereby, while the outside wheel continues to rotate the section of agitator shaft driven by said wheel. The clutch automatically operates to reconnect the wheels to the agitators upon forward movement of the distributor being resumed.

A still further object of the invention is to provide clutch means which are simple and durable in nature, inexpensive to manufacture and install upon an agricultural distributor of the type referred to, and the operating means of the clutch mechanism are readily available exteriorly of the wheels of the distributor for manual operation, or in the preferred embodiment of the invention, for automatic operation.

Details of the invention and the foregoing objects, as well as other objects thereof, are set forth in the following specification and illustrated in the accompanying drawing comprising a part thereof.

In the drawing:

Fig. 1 is a plan view, partly broken away to foreshorten the same, of an exemplary agricultural distributor embodying the principles of the present invention, a portion of the mechanism illustrated therein being in section to illustrate certain details of the invention.

Fig. 2 is a sectional plan view of one end of the distributor shown in Fig. 1, taken on the line 2—2 of Fig. 1, and showing on a larger scale than in said figure exemplary details of clutch means embodying the principles of the invention.

Fig. 3 is a vertical end elevation of the mechanism shown in Fig. 2.

Fig. 4 is a view similar to Fig. 3 but showing another embodiment of clutch mechanism incorporating the principles of the invention.

Although an exemplary agricultural distributor 10 comprising a conventional lime, fertilizer, or seed distributor has been selected for each of illustrating the principles of the invention, it is to be understood that the present invention also is applicable to other types of agricultural distributors such as manure spreaders, and the like.

Referring to Fig. 1, it will be seen that the exemplary agricultural distributor 10 comprises an elongated body 12 having opposite sides 14 and 16 fixed thereto. Any suitable axle and bearing means may be used for rotatably supporting a pair of wheels 18 and 20 relative to said sides. For purposes of rendering the structure embodying the present invention more simple, it is preferred that sleeve-like bearings 22 be utilized, said bearings each having a radially extending flange 24 which preferably abuts the sides of the body 12, such as the side 14 as shown in Fig. 2. Any convenient means such as a plurality of bolts 26 may be used to attach the flange 24 of the bearing to the side of the body as by the bolts extending through apertures in the side 14 and projecting into suitable threaded holes within the flange 24, thereby firmly but detachably securing the sleeve-like bearing 22 to a side of the body.

The bearing 22 and flange 24 may be formed from a suitable casting which is machined or otherwise fashioned to provide precise internal and external bearing surfaces which preferably are fitted with bearing sleeves 28 and 30 formed of bronze or any other suitable type of material.

Each of the wheels 18 and 20 are provided with a hub 32 having a preferably cylindrical axial opening 34, the inner end thereof receiving the bearing sleeve 30 which preferably is fixed within the opening 34 to hub 32. Thereby, the sleeve 30 will rotate relative to the sleeve-like bearing 22 which is fixed to the side 14 of body 12. In accordance with good engineering practice, a spacing bearing ring 36 may be provided between the outer face of flange 24 and the inner face of hub 32 of wheel 18 as shown in Fig. 2, this construction of course being common to the bearing arrangement of both of the wheels 18 and 20.

The body 12 also is provided with material agitating means 38 which are mounted within the lower portion of the body 12 so as constantly to agitate the material to be distributed within the body 12 and preferably the material in the bottom of the body adjacent the discharge or distributing openings therein. Such openings are not specifically shown in the present illustration but the construction and arrangement thereof is well known to those familiar with this art. The agitating means 38 comprises, in the preferred embodiment of the invention, shaft means 40 which are arranged in two sections respectively serving opposite longitudinal halves of the body 12. Accordingly, the body 12, intermediately of the sides 14 and 16 thereof, is provided with a plurality of juxtapositioned fixed bearings 42 which respectively rotatably support the inner ends of the two sections of shaft means 40. Further, each section of shaft means 40 has suitable agitator members 44 fixed thereto, the same being constructed in position so as effectively to distribute and agitate the material in the bottom portion of body 12 as the shaft means 40 are rotated respectively by the wheels 18 and 20, especially when the distributor 10 is being moved forwardly by a tractor unit or the like.

The sleeve-like bearing 22 and particularly the bearing sleeve 28 fixed within the same rotatably support a drive shaft 46 which is interconnected to one section of shaft means 40 by any suitable means such as a socket 48 fixed to the inner end, for example, of drive shaft 46 for purposes of receiving a complementarily shaped terminal end 50 fixed to the shaft means 40 as clearly shown in Fig. 2. In cross-section, the sockets 48 and terminal end 50 are of complementary geometrical configuration such as square, hexagonal or the like, for purposes of preventing relative rotation between shaft means 40 and drive shaft 46.

It also is desirable that the shaft means 40 of agitating means 38 be removable at intervals from the body 12 in order that suitable cleaning of the distributor might be effected, particularly since certain types of commercial fertilizer are corrosive. Hence, at the end of a distributing operation, and particularly at the end of use of the distributor for a few days or longer, it is preferred that the distributor be cleaned to prevent such corrosion from occurring and deteriorating the parts of the distributor which are engaged by the material which has been used in the distributor such as said fertilizer. Accordingly, the fixed bearings 42 usually are of such nature as to permit this disengagement of the inner end of each shaft means 40 respectively therefrom and, after said inner ends are freed from the bearings 42, the outer or terminal ends 50 thereof readily may be removed from the sockets 48 formed on the inner ends of drive shafts 46 provided at opposite sides of the body 12.

In accordance with the principles of the persent invention, the outer ends of the drive shaft 46 provided at opposite sides of the body 12 project beyond the outer ends of hubs 32 of the wheels 18 and 20, as clearly shown in Fig. 2. The outer portions of each of the axial openings 34 in the hubs 32 are provided with concentric, interfitted bearing sleeves 52, 54 and 56, the sleeve 54 particularly being formed of suitable bearing material such as bronze or the like. The sleeve 56 supports the outer end of drive shaft 46 rotatably and is of similar construction to bearing sleeve 28. Thus, it will be seen that the drive shaft 46 is supported firmly for axial rotation concentrically relative to the fixed sleeve-like bearing 22, as well as hub 32 of the wheel. This particular type of bearing arrangement is beneficial for purposes of adequate lubrication of the various relatively moving hub, shaft, and bearing members.

Clutch mechanism comprising the principal features of the present invention is mounted externally of the hub 32 of each wheel, whereby the same is readily available for actuation. Furthermore, by arranging the clutch mechanism so as to be externally of the hub 32 both peripherally and longitudinally, a compact mounting of the wheels 18 and 20 upon the sleeve-like bearings 22 adjacent sides 14 and 16 of body 12 is possible. According to the preferred embodiment of the invention, a driving member 58 of the clutch mechanism comprises a ratchet wheel including hub means fixed by a pin 60 to the outer end of drive shaft 46. Projecting radially from the hub means of the clutch member 58 are a plurality of circumferentially spaced projecting ratchet tooth members 62 disposed within a common plane transverse to shaft 46. One side 64 of each member comprises a pressure surface which preferably is slightly undercut so as somewhat to conform to the external surface of movable clutch member 66. The opposite side of each projecting member 62 comprises a cam or ratchet surface 68 for purposes to be described.

The movable clutch member 66 or dog is pivotally connected to hub 32 of one of the wheels 18 or 20. Said hub is provided with a suitable recess 70 extending substantially radially inward from the peripheral surface of the hub as shown in Fig. 2 and extending also through the outer end of the hub 32. Preferably, the hub is cast or otherwise formed so as to have an enlarged boss 72 to provide substantial depth to the recess 70 and also afford strength and a suitable mass of material within which the socket 74 may be formed for purposes of receiving a compressing spring 76.

For purposes of strength, ease of camming and economy of manufacture, the movable clutch member 66 may be cut from cylindrical bar stock and the inner end of the movable member 66 is provided with a transverse hole to receive a pivot pin 78 which also extends through the boss 72 at opposite sides of recess 70. Further, the recess 70 is of such width as to receive the movable clutch member 66 for relatively free pivotal movement of the member within the recess about the pivot pin 78. However, said width of the recess 70 only slightly exceeds the diameter of member 66 so as to afford adequate braced support of the member 66 when the same is positioned in the full line position thereof shown in Fig. 2, substantially parallel to the axis of drive shaft 46 and perpendicular to the plane of ratchet tooth member 62. Said position is the operative position of the movable clutch member 66 and, when so positioned, the body, as distinguished from the end, of member 66 will be engaged by the side 64 of one of the projecting members 66 of the ratchet wheel driving member 58 of the clutch mechanism.

To facilitate maintaining the movable clutch member or dog 66 in the operative position thereof shown in full lines in Fig. 2, the inner end 80 of said member is formed so as to be disposed at a slight acute angle to the outer face of longitudinally movable guide 82 which is disposed within socket 74 and is engaged by the outer end of compression spring 76. This arrangement insures constant urging of the outer end of movable clutch member 66 in counter-clockwise direction, as viewed in Fig. 2, and into firm engagement with the undercut side surface 64 of the projecting member 62 engaged by member 66 when the wheels 18 and 20 are moving forwardly for purposes of driving the agitating means 38 which embodies interconnected shaft means 40 and 46.

When the distributor 10 is moved either in backward direction or, as when making a sharp turn, the pivoting wheel is moved slightly backward while the outside wheel continues to move forwardly, the embodiment of clutch mechanism illustrated particularly in Figs. 2 and 3 automatically will function to disengage the movable clutch member 66 from the particular projecting member 62 which has been driving the same. Forward movement of the wheels 18 or 20 will move driving member 58 of the clutch mechanism in the direction of the solid arrow shown in Fig. 3. However, reverse movement of the wheels will cause the driving member 58 of the clutch to move in the direction of the broken arrow shown in Fig. 3 and, under such circumstances, the cam surface 68 of the next succeeding projecting member 62 will engage the outer end portion of movable clutch member 66 and cause said member to be moved only partially toward the dotted line, or inoperative position, thereof illustrated in Fig. 2, sufficiently for the member 66 to ride over the outer end of said projecting member 62 and the spring 76 will then restore the movable clutch member to the full line position. If reverse movement of the wheel continues, such ratcheting movement of the clutch will continue and no rotation of the agitator takes place until forward movement of the wheel is resumed. When the latter takes place, the several clutch members automatically are restored to driving relationship to connect the wheel and agitator.

If it is desired to completely disconnect the clutch members such as when driving out to a field, the outer end of member 66 is engaged manually readily and moved to the dotted line position thereof shown in Fig. 2, where it will be held by spring 76 and guide 82. To commence action of the distributors, member 66 then is moved manually to the full line position thereof shown in Fig. 2. The movable clutch member 66 preferably is sufficiently long that the outer end thereof may serve as a manually engageable portion by which said member may be operated either to connect the clutch members or disconnect the same.

Another embodiment of clutch means incorporating the basic principles of the embodiment shown in Figs. 2 and 3 is illustrated in Fig. 4. In said embodiment, a driving clutch member 84 is provided with hub means which is fixed to the outer end of drive shaft 46 by a transverse pin 86. The driving clutch member 84 is provided with a substantially circular flange 88 which projects radially from the axis of drive shaft 46 and is provided with a plurality of similar notches 90 which extend radially inward from the periphery of flange 88, the notches also preferably being spaced even circumferentially around the flange. The notches 90 are of suitable width to receive the outer end of a movable clutch member such as member 66 of the embodiment shown in Figs. 2 and 3 which is supported by the hub 32 of each wheel. In effect, the portions of flange 88 between notches 90 comprise projecting members engageable with movable clutch member 66. The principal difference between the embodiment shown in Fig. 4 and that shown in Figs. 2 and 3 lies in the construction of the driving clutch member 84. The clutch arrangement otherwise is the same as that shown in the embodiment illustrated in Figs. 2 and 3 and offers all of the advantages of strength and ease of operation present in the latter embodiment.

When using the clutch embodiment shown in Fig. 4, it is necessary to disengage the movable clutch member 56 manually from the driving clutch member 84, as well as manually dispose the member 66 in one of the notches 90 of clutch member 84. Such arrangement is compact and durable and is disposed exteriorly of the periphery of the hub 32 of one or both wheels and also exteriorly of the outer ends of said hub. Thus, not only is the clutch readily operable manually inasmuch as it is positioned in a freely exposed manner, but minimum space may be provided between the wheels and the sides 14 and 16 of the body 12.

It is to be understood that in the event a plurality of sections of agitating means 38 are not desired, only a single agitator which extends continuously from one side to the other of body 12 may be used. In such event, it only is necessary to provide a clutch mechanism at one end of the distributor 10 relative to only one wheel so as to be operated thereby.

From the foregoing, it will be seen that several embodiments of simple, rugged and durable clutch means are provided for use on an agricultural distributor exteriorly of the peripheries of the hubs and outer ends of one or both wheels of the distributor. In one embodiment, driving disengagement of wheels from the agitators is effected automatically, simply by moving one or both of the wheels reversely to the forward or driving direction of the wheels. In both embodiments however, the movable clutch member is readily accessible for manual actuation either to engage or disengage the driving clutch member.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. An agricultural distributor having a body supported by hubbed wheels and a rotatable element in the body thereof driven by shaft means extending through the hub of at least one of said wheels, in combination with driving means for said shaft means comprising; a driving clutch member fixed to the outer end of said shaft means and rotatable therewith outwardly from and adjacent the outer end of the hub of said one wheel, a plurality of circumferentially spaced projecting members carried by said member and disposed in a common plane transverse to said shaft means, one side of each member comprising an abutting surface substantially parallel to said shaft means; an elongated clutch member movably connected to the hub of said one wheel within an elongated recess of substantial length formed in said hub and extending axially inward from the periphery and outer end of said hub; means adjacent the inner end of said recess pivotally connecting said elongated clutch member within said recess for movement relative thereto between an inoperative position substantially transverse to said shaft means and an operative position between the opposite side walls of said recess wherein said clutch member is substantially transverse to the plane of said projecting members for engagement with the abutting surface of one of said projecting members by the body portion of said movable clutch member intermediately of the ends thereof while a substantial portion of the length of said clutch member effectively is braced between the walls of said elongated recess; and means constantly urging said movable clutch member toward said operative position but being yieldable to permit movement of said member to the inoperative position thereof, the outer end of said elongated clutch member when in operative position extending beyond said projecting members in the direction of said shaft means, whereby said outer end thereof comprises a manually engageable means to actuate said movable clutch member.

2. The drive means set forth in claim 1 further characterized by the walls of the recess in the hub of the wheel which accommodates the movable clutch member being spaced apart only slightly greater than the opposite sides of the movable clutch member which respectively are adjacent said cavity walls when said movable member is disposed in operative position therein, whereby said cavity walls brace said movable clutch member when in said position.

3. An agricultural distributor having a body supported by hubbed wheels and a rotatable element in the body thereof driven by shaft means extending through the hub of at least one of said wheels, in combination with driving means for said shaft means comprising; a driving clutch member fixed to the outer end of said shaft means and rotatable therewith exteriorly of the outer end of the hub of said one wheel, a plurality of circumferentially spaced members projecting radially outward from said hub of said member and disposed in a common plane transverse to said shaft means, one side of each member comprising a cam surface and the other side of each comprising an abutting surface substantially parallel to said shaft means; an elongated clutch member movably connected to the hub of said one wheel within a recess formed in the hub of said one wheel and extending inward from the periphery and outer end of said hub, said elongated clutch member being pivotally connected at one end within said recess for movement relative thereto between an inoperative position substantially transverse to said shaft means and an operative position substantially transverse to the plane of said projecting members for engagement with the abutting surface of one of said projecting members; and means constantly urging said movable clutch member toward said operative position but permitting movement of said member partially toward the inoperative position thereof when the wheel moves in backward direction and brings the cam surface of the next succeeding projecting member into engagement with said movable clutch member, whereby said rotatable element automatically is disengaged from said driving means when said wheel which carries the movable clutch member is rotated backwardly, said last mentioned means automatically restoring said movable clutch member to operative position upon the wheel moving forwardly.

4. The drive means set forth in claim 3 further characterized by said last mentioned means comprising a compression spring acting against the inner end of said elongated movable clutch member, said latter end also being at an acute angle to the axis of said member, whereby said spring acts constantly against said end to urge said member toward the operative position thereof and effects restoration of said member toward said operative position after each camming thereof from said operative position when said wheel is rotated backwardly.

References Cited in the file of this patent

UNITED STATES PATENTS

| 2,086,809 | Kreis | July 13, 1937 |
| 2,592,668 | Dufour | Apr. 15, 1952 |
| 2,706,548 | Murphy | Apr. 19, 1955 |